United States Patent
Fischer-Jensen et al.

(10) Patent No.: US 6,530,468 B2
(45) Date of Patent: Mar. 11, 2003

(54) CONVEYOR HAVING A CHAIN DRIVE MECHANISM

(75) Inventors: Peter Fischer-Jensen, Århus V (DK); Niels Lomborg Nielsen, Mundelstrup (DK); Jakob Bro Sørensen, Østbirk (DK)

(73) Assignee: Crisplant a/s, Århus (DK)

( * ) Notice: Subject to any disclaimer, the term of this patent is extended or adjusted under 35 U.S.C. 154(b) by 0 days.

(21) Appl. No.: 09/801,652

(22) Filed: Mar. 9, 2001

(65) Prior Publication Data
US 2002/0038758 A1 Apr. 4, 2002

(30) Foreign Application Priority Data
Sep. 21, 2000 (DK) .................... PA 2000-01400

(51) Int. Cl.7 ............................ B65G 17/00; B65G 23/14
(52) U.S. Cl. ........................ 198/833; 198/779
(58) Field of Search ................. 198/833, 779, 198/832

(56) References Cited

U.S. PATENT DOCUMENTS

| 614,306 | A | * | 11/1898 | Mason ..................... 198/833 |
| 2,609,086 | A | * | 9/1952 | McBride et al. ............ 198/833 |
| 3,460,668 | A | * | 8/1969 | Gerrans .................... 198/833 |
| 4,174,774 | A | * | 11/1979 | Bourgeois .................. 198/779 |
| 4,757,893 | A | * | 7/1988 | Shabram, Jr. et al. ... 198/474.1 |
| 4,872,564 | A | * | 10/1989 | Van Der Schoot .......... 198/387 |
| 5,307,920 | A | * | 5/1994 | Meyer et al. ............... 198/833 |
| 5,348,139 | A | * | 9/1994 | Szarkowksi et al. ........ 198/781 |
| 5,868,193 | A | * | 2/1999 | Luginbuhl et al. .......... 198/814 |
| 6,223,888 | B1 | | 5/2001 | Jahns |
| 6,282,866 | B1 | * | 9/2001 | Natterer et al. ............. 198/833 |

FOREIGN PATENT DOCUMENTS

| CH | 429 584 | 1/1967 |
| DE | 14 56 561 A | 5/1973 |
| DE | 28 33 479 A | 10/1979 |
| EP | 0532137 | 9/1992 |
| EP | 0753474 | 1/1996 |
| EP | 0960842 | 5/1999 |
| WO | WO 0001598 | 1/2000 |
| WO | WO 0040485 | 7/2000 |

* cited by examiner

Primary Examiner—Douglas Hess
(74) Attorney, Agent, or Firm—Birch, Stewart, Kolasch & Birch, LLP

(57) ABSTRACT

A conveyor is disclosed having a mechanism for driving an endless chain, which is used for driving and optionally also for supporting the article-supporting parts of the conveyor. The mechanism comprises a drive belt that engages and drives on a number of wheels on the chain. By driving on the periphery of the rotating wheels instead of directly on the chain itself, the force between the drive belt and the point of engagement with the chain is halved whereby the construction may be made substantially lighter.

12 Claims, 3 Drawing Sheets

CONVEYOR HAVING A CHAIN DRIVE MECHANISM

The present invention relates to a conveyor having a mechanism for driving an endless chain, which is used for driving and optionally also for supporting the article-supporting parts of the conveyor. The mechanism comprises a drive belt that engages and drives on a number of wheels on the chain. By driving on the periphery of the rotating wheels instead of directly on the chain itself, the force between the drive belt and the point of engagement with the chain is halved whereby the construction may be made substantially lighter.

In a preferred embodiment, the drive mechanism is displaceable arranged with respect to the stationary part of the conveyor along a path having an angle with the transport direction of the conveyor so that the reactive force on the drive mechanism caused by the driving force applied to the wheels causes the drive mechanism to be biased towards the wheels whereby the normal force from the mechanism on the wheels is self-adjusting, depending on the magnitude of the required drive force.

The present invention further relates to the drive mechanism as such according to the preferred embodiment.

BACKGROUND OF THE INVENTION

Drive chains for conveyors are known in the art to be driven with various drive mechanisms. The best known is probably a sprocket wheel drive in which the teeth of a sprocket wheel engage with openings in the chain. The sprocket wheel drive requires an equidistant distribution of the openings in the chain which may cause problems when the chain becomes worn and in all cases presents an inconvenience when using chain links of a standard length to construct a chain of a particular length, because any difference between the required length of the chain and an integer multiple of the standard length must be carefully distributed between all the links in order to match the chain and the sprocket wheel. Furthermore, the links must be of an adjustable length and the sprocket wheel drive tends to produce noise in operation. A chain to be driven by a sprocket wheel drive is disclosed in GB-A-333707.

Another type of drive mechanism is a friction drive in which a wheel or an endless belt engages a substantially straight closed surface of the chain as disclosed in EP-A-0532137 and in EP-A-0768252. The endless belt is normally biased into engagement with the chain by a couples of springs or the like as disclosed in EP-A-0532137. The present invention has in particular the advantages with respect to the known art:

The drive mechanism engages with the periphery of wheels mounted on the chain, whereby the drive force transmitted between the drive mechanism and the chain is halved and the mechanism can be made of a lighter construction, the drive mechanism is self-adjusting with respect to the normal force on the chain, whereby unnecessary wear on the contact parts of the belt and the wheels is avoided during operational conditions where the required drive force and thus the required normal force is low, and the drive mechanism is self-balancing with respect to the distribution of normal force among the wheels with which the drive mechanism is in engagement.

BRIEF DESCRIPTION OF THE INVENTION

Thus, the present invention relates to a conveyor comprising a stationary track part defining a closed conveyor path, a flexible elongated drive chain including a plurality of consecutive links being pivotally interconnected to adjacent links so as to form a closed loop that is movable along said conveyor path within the track part, a plurality of drive wheels being mounted on the drive chain, the rotation axes of the drive wheels being substantially parallel and perpendicular to the elongated direction of the chain, and at least one drive mechanism arranged along the stationary track part and comprising a drive means for engaging and applying a driving force on the periphery of at least one of said drive wheels in the direction of movement of the chain, and support means for engaging said drive wheel(s) being in engagement with the drive means on the opposite side of the periphery of the wheel(s) and applying a reactive force on the wheel(s) of a magnitude and direction as the driving force.

It is preferred that the support means comprises a stationary side face on which the wheels rolls, although a support means comprising a driven endless belt moving along or opposite to the chain could be employed according to the invention.

The drive wheels are preferably arranged substantially equidistantly along the elongated direction of the chain and are of substantially identical diameter. The wheels may along the remaining part of the serve as guide wheels for guiding the chain between sides of the track part along the path of the chain or as supporting wheels for at least partly supporting the weight of the chain on a track part, depending on the orientation of wheel axes being vertical or horizontal.

The drive mechanism further comprises a drive unit, such as an electrical motor, for driving the drive mechanism, and a control unit for controlling the torque and the angular velocity of the motor.

The drive mechanism and the support means may be mounted with a well-defined constant opening for the wheels defined there between, but in preferred embodiments of the present invention, the drive mechanism comprises biasing means arranged for biasing the drive means towards the drive wheels so as to exert a normal force on the drive wheels of a sufficient magnitude to prevent slippage between the wheels and the drive means and between the wheels and the support means, the support means being suitable for exerting a reactive force on the wheels to counteract the normal force. Such biasing means may be e.g. springs, pneumatic cylinders or the self-adjusting biasing device of the present invention being disclosed below in details.

The drive mechanism may be arranged so that the mechanism engages one wheel at a time and the inertia of the chain and the conveyor makes the movement of the conveyor continuous, but it is for the smoothness of operation and stresses on the driving part preferred that the drive wheels and the at least one drive mechanism are arranged so that there is constantly at least one of the drive wheels in engagement with a drive mechanism during operation of the conveyor.

In the most preferred embodiment the drive means comprises an endless belt engaging at least two consecutive drive wheels simultaneously, preferably from 3 to 12 wheels and in the most preferred embodiment 7 wheels.

When more that one wheel is engaged, it is of importance that the biasing means are arranged for providing substantially identical normal forces on the drive wheels being in engagement with the drive means so that the wear is equally distributed and so that the drive means does not slip on one or more of the wheels on which the normal force is lower than required.

A preferred solution to the normal force distribution is that the drive means are pivotally arranged with respect to the track part about an axis being parallel to the rotation axes of the drive wheels so as to distribute the normal force exerted by the biasing means equally between the drive wheels engaged by the drive means.

The self-adjustment of the normal force so that the force is sufficient to prevent slippage between the surfaces but is low enough to prevent unnecessary wear and stress on the contact parts is achieved when the biasing means is constituted by a frame part on which the drive means are arranged, the frame part being displaceable arranged with respect to the track part along a tensioning path having an angle with the direction of movement of the chain so that the reactive force on the drive means from applying the driving force to the drive wheel(s) will tend to bias the drive means towards the drive wheels.

The self-adjustment according to the present invention may be combined with another biasing means, such as one or more pre-tensioned springs. However, it is for the simplicity of the device preferred that the self-adjustment is the sole means of biasing the drive mechanism towards the wheels, and in order to make such self-adjustment workable, the friction coefficient between the drive wheels and the drive means as well as the friction coefficient between the drive wheels and the support means should be greater than tangents to the angle between the tensioning path and the direction of movement of the chain. In particular, the friction coefficients should be to 1.5 times the tangents to said angle, and preferably be in the range from 1.1 to 1.3 times the tangents to said angle.

The surfaces of the drive means and the support means engaging the drive wheels may in order to prevent slippage between the wheels and the drive means and between the wheels and the support means be equipped with a friction enhancing material, such as a natural or synthetic rubber.

According to a further aspect, the present invention also relates to a drive mechanism as such being self-adjusting with respect to the magnitude of the normal force on the drive chain of a driven conveyor, said drive mechanism comprising a drive means for engaging and applying a driving force to a drive chain of the conveyor, the drive mechanism comprises biasing means arranged for biasing the drive means towards the drive chain so as to exert a normal force on the drive chain of a sufficient magnitude to prevent slippage between the chain and the drive means, wherein the biasing means is constituted by a frame part on which the drive means are arranged, the frame part being displaceable arranged along a tensioning path having an angle ($\phi$) with the direction of movement of the drive chain so that the reactive force on the drive means from applying the driving force to the drive chain will tend to bias the drive means towards the drive chain.

BRIEF DESCRIPTION OF FIGURES

A preferred embodiment of the present invention is illustrated with the accompanying drawings in which.

DETAILED DESCRIPTION OF AN EMBODIMENT OF THE INVENTION

Figure 1:
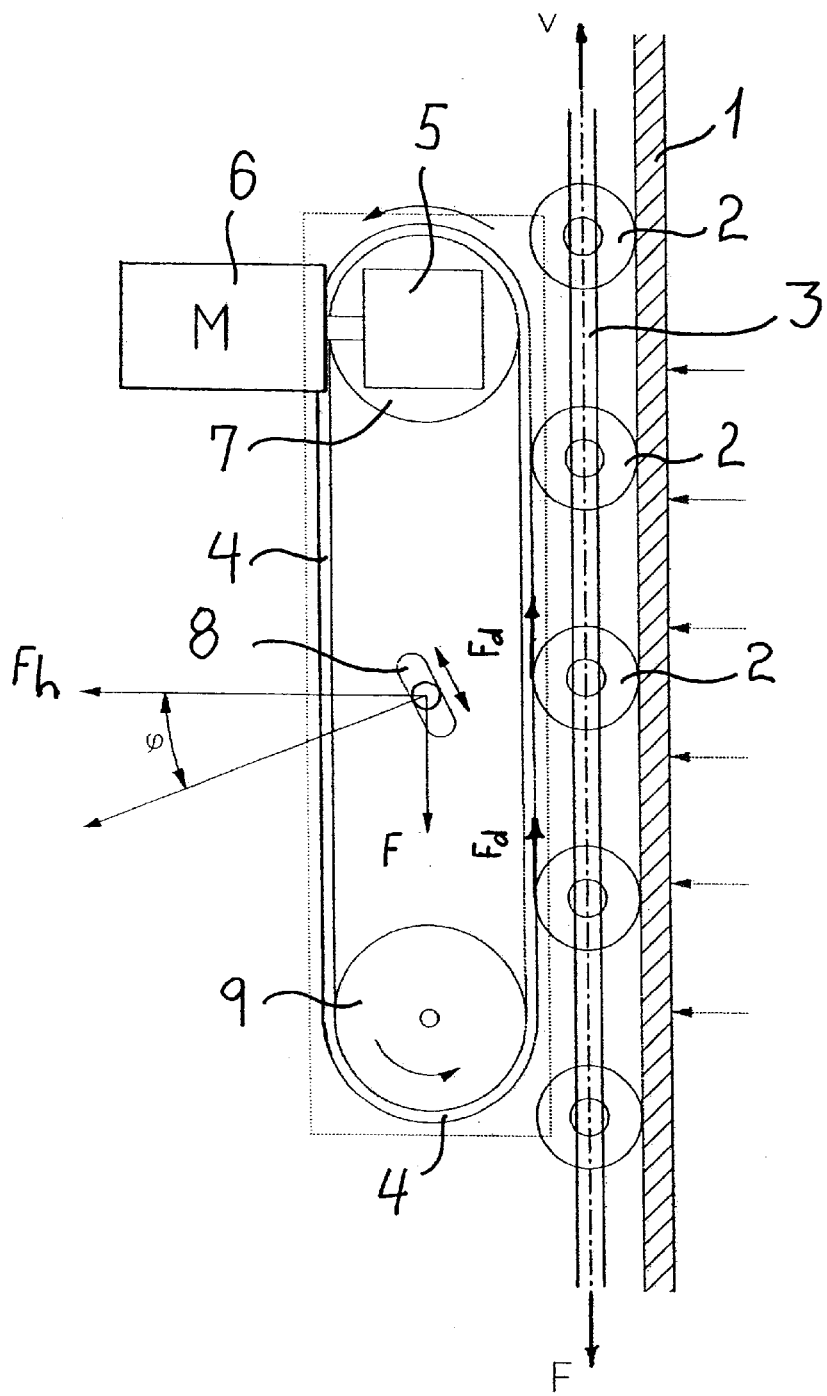
FIG. 1 is a section of the drive mechanism and the chain.

The chain drive mechanism is shown from above in FIG. 1, which is a section of the mechanism and the chain 3 as seen from above. The chain 3 continues in an endless track in the plane of the section.

The chain 3 is situated in a track between a support plate 1 and the drive belt 4 of the drive mechanism and moves in the track with a constant velocity V. The chain 3 is equipped with drive wheels 2 on the periphery of which the drive belt 4 is biased with a normal force $F_n$ and drives with a drive force $F_d$ being half of the chain force $F_c$ applied by that wheel, $F_d = F_c/2$, and must be less than the product of the friction coefficient between the drive belt 4 and the wheel 2 and the normal force, $F_d < \mu \cdot Fn$, so as to prevent slippage between the drive belt 4 and the wheel 2. The drive belt 4 is made form a material with suitable properties with respect to durability and strength, such as a polyurethane belt reinforced with fibers, such as glass, carbon or natural fibers, and preferably having a felt layer on the inner side towards the belt driving wheel 7 and the support wheel 9 so as to diminish the wear on the belt 4 and to dampen noise.

The drive belt 4 is on the inside opposite the wheels 2 supported by a back rest (not shown) with a low-friction surface, preferably provided with a row of rollers on which the inner side of the drive belt 4 slides so as to decrease wear on the belt 4 and friction losses. The sum of the chain forces $F_c$ for the individual wheels 2 is equal to the total chain force F, which counters the friction forces etc. exerted on the movable part of the conveyor. The support plate exerts a normal force on the wheel 2 of the same magnitude as $F_n$ but of the opposite direction as well as with a reactive force of the same magnitude and direction as the drive force $F_d$ for which reason the friction coefficient between the wheel 2 and the support plate 1 must fulfil the same requirement as the friction coefficient between the wheel 2 and the drive belt 4.

Figure 2:
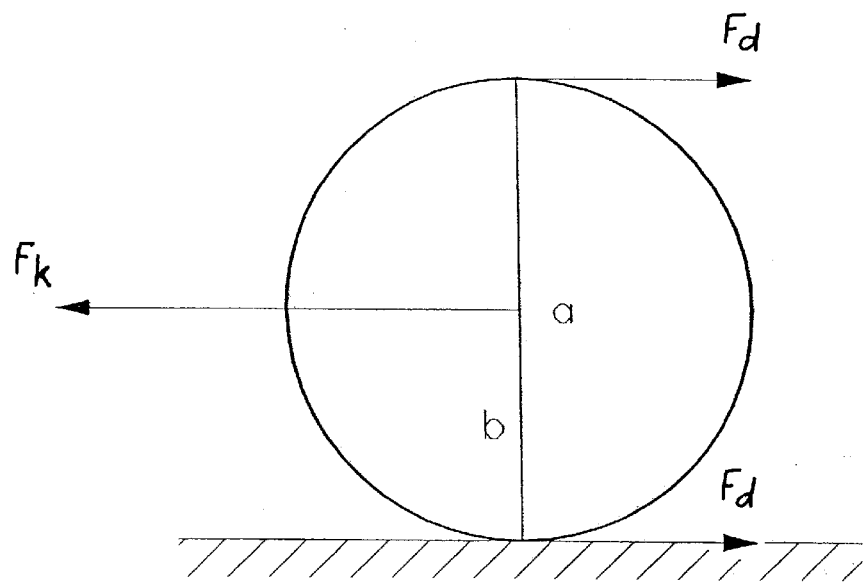
FIG. 2 illustrates the forces acting on the wheel.

Two forces act on the wheel 2 as shown in FIG. 2 and result in a torque about the point of contact between the wheel 2 and the support plate 1, $F_d$ with the arm a being the diameter of the wheel 2, and $F_c$ with the arm b being the radius of the wheel 2. A constant velocity V of the chain 3 means that the angular velocity about the point of contact is constant and thus $F_d = F_c/2$ which is in contrast to known drive mechanisms being in direct engagement with the chain itself whereby the double drive force must be applied. The drive mechanism can be of a lighter design due to the lower drive force $F_d$ and the wear on the engaging parts is reduced.

The drive mechanism is made self-adjusting with respect to the normal force $F_n$ exerted on the wheels 2 by mounting the drive belt 4, the gear 5, the motor 6, the belt driving wheel 7 and the belt supporting wheel 9 on a frame which is displaceable and pivotally arranged in a slandered slot 8 along which the drive mechanism can move and pivot freely. When the drive belt 4 exerts a drive force on the chain 3, the drive belt 4 and with it the drive mechanism will be impressed by a reactive force of the same magnitude and direction as the chain force F. This reactive force will pull the drive mechanism backwards and increase the normal force on the chain 3 due to the design of the tensioning slot 8. The normal force will thereby be adjusted to the requirements at varying chain forces F and the wear and stress on the wheels 2, drive belt 4 and other parts will therefore be minimized. By arranging the drive mechanism pivotally it is achieved that the total normal force on the chain 3 is distributed equally on the wheels 2 with which the drive belt 4 is engaged.

If the forces on the wheels 2 with which the drive belt 4 is engaged are assumed to be the same for all wheels 2, the following can be deduced:

The sum of the drive forces $F_d$ on the wheels 2 is equal to the total chain force F and is thus less than the friction coefficient $\mu$ between the drive belt 4 and the wheel 2 multiplied by the sum $F_h$ of the normal forces on the wheels 2, $F_n$ $$F < \mu \cdot F_h$$

$\mu$ typically being of a magnitude of about 1. The drive mechanism will during operation be influenced by a force counteracting the chain force F and the sum $F_h$ of the normal forces. These two forces are perpendicular and are of the ratio $\tan(\phi)$ in which $\phi$ is the angle between the tensioning slot 8 and the direction of movement of the chain 3, $$F = F_h \cdot \tan(\phi).$$

Hereby, the following design condition for the relation between the angle $\phi$ and the friction coefficient $\mu$ is achieved:

$$\tan(\phi) < \mu$$

Figure 3:
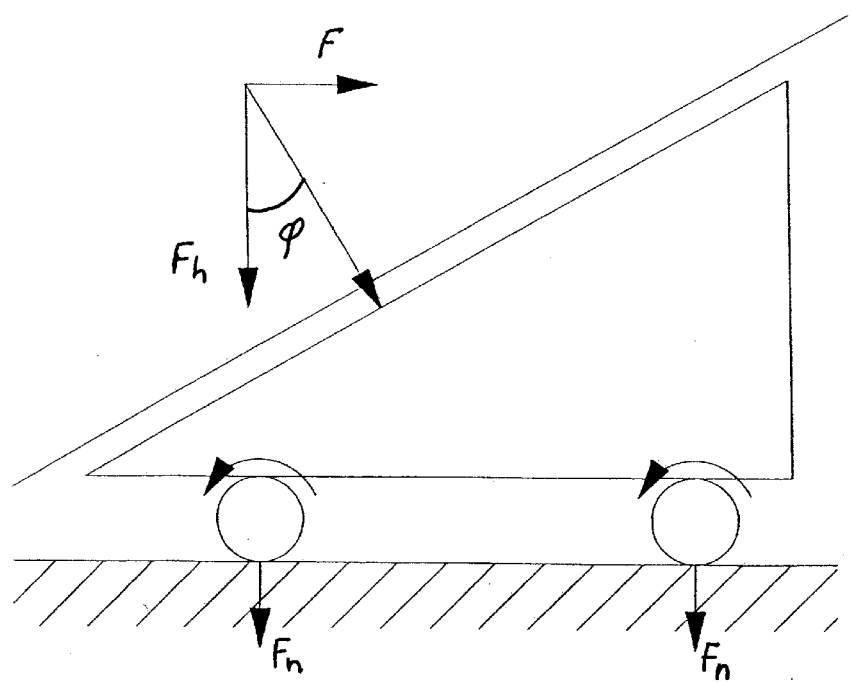
FIG. 3 is a schematic presentation the forces involved in the self-adjustment of the normal forces.

The forces involved are illustrated in FIG. 3. For practical design, the angle $\phi$ is designed so that the friction coefficient is somewhat larger than the tangents to the angle $\phi$ to compensate for changes of the coefficient due to wear and time dependent changes of the material. On the other hand, the advantages of the self-adjusting normal force are eliminated if the friction coefficient is much larger. Thus, it is preferred that the angle $\phi$ is designed so that $\tan(\phi) < 1.5 \cdot \mu$, preferably that $\tan(\phi) = 1.1 - 1.3 \cdot \mu$.

Figure 4:
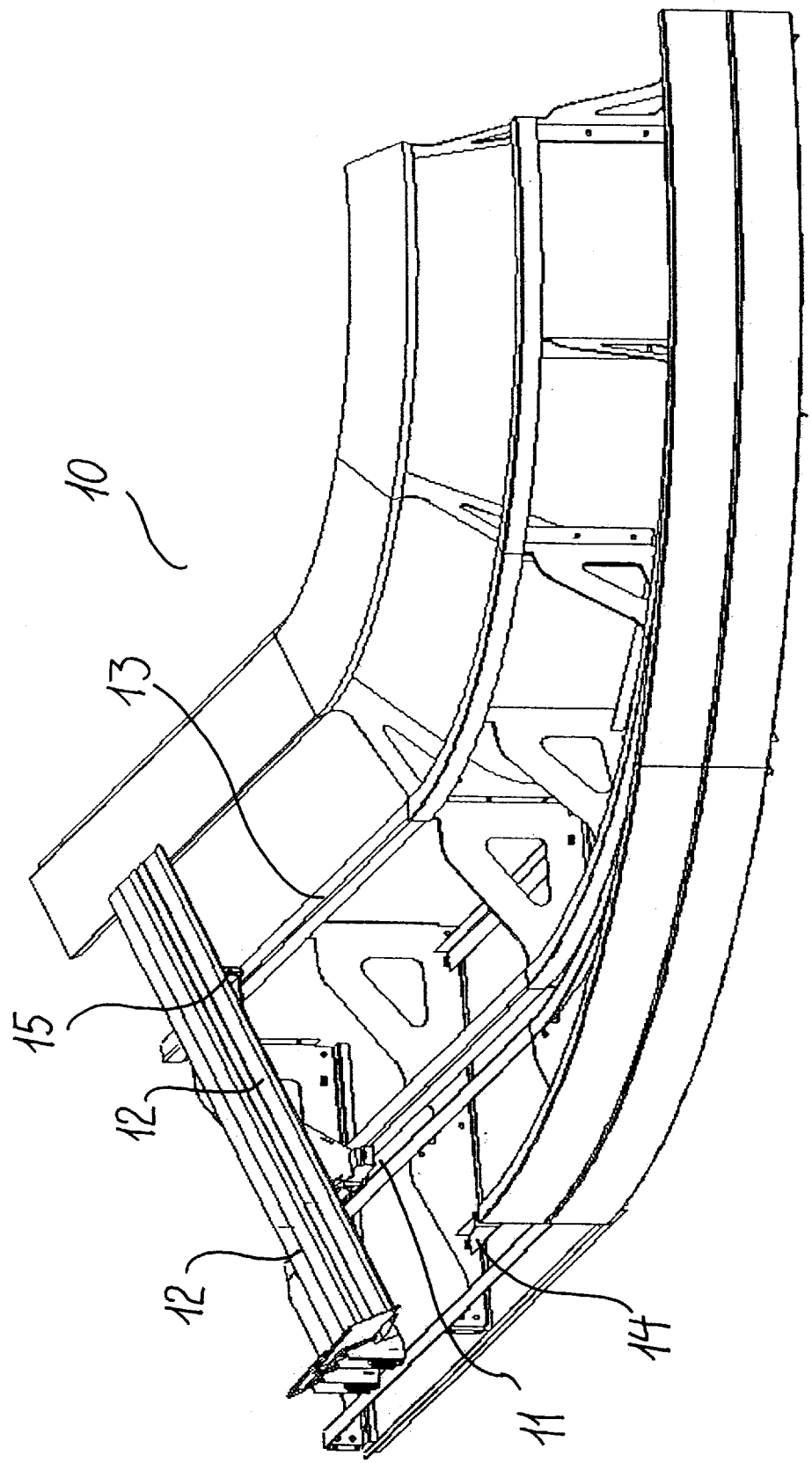
FIG. 4 is a perspective view of a part of a conveyor.

A perspective view of a conveyor is shown in FIG. 4 in which the stationary frame part 10 comprises a chain track 11 in which the drive chain 3 moves, the chain track 11 having vertical sides with which the wheels 2 interact so as to serve as guide wheels for the chain 3 except when passing the drive mechanism. A slat 12 is connected to each link of the drive chain 3 and the slats 12 form together an article-supporting surface for supporting the conveyed articles. An upper track 13 and a lower track 14 are also provided in the frame part 10 for accommodating a respective upper support wheel 15 and lower support wheel (not shown) of each of the slats.

What is claimed is:

1. A conveyor comprising
 a stationary track part defining a closed conveyor path,
 a flexible elongated drive chain including a plurality of consecutive links being pivotally interconnected to adjacent links so as to form a closed loop that is movable along said conveyor path within the track part,
 a plurality of drive wheels being mounted on the drive chain, the rotation axes of the drive wheels being arranged in a mutually substantially parallel fashion in such a way that they are perpendicular to the elongated direction of the chain,
 at least one drive mechanism arranged along the stationary track part and comprising a drive means for engaging and applying a driving force on the periphery of at least one of said drive wheels in the direction of movement of the chain, and
 stationary support means for engaging said drive wheel(s) being in engagement with the drive means on the opposite side of the periphery of the wheel(s) and applying a reactive force on the wheel(s) of a magnitude and direction as the driving force,
 the drive mechanism comprising biasing means arranged for biasing the drive means towards the drive wheels so as to exert a normal force on the drive wheels of a sufficient magnitude to prevent slippage between the wheels and the drive means and between the wheels and the support means, the biasing means having a frame part on which the drive means are arranged, the frame part being displaceably arranged with respect to the track part along a tensioning path defining an acute angle ($\phi$) with the direction of movement of the chain, so that the reactive force biases the drive means towards the drive wheels.

2. The conveyor according to claim 1, wherein the drive wheels and the at least one drive mechanism are arranged so that there is constantly at least one of the drive wheels in engagement with a drive mechanism during operation of the conveyor.

3. The conveyor according claim 1, wherein the drive means comprises an endless belt engaging at least two consecutive drive wheels simultaneously.

4. The conveyor according to claim 1, wherein the biasing means are arranged for providing substantially identical normal forces on the drive wheels being in engagement with the drive means.

5. The conveyor according to claim 4, wherein the drive means are pivotally arranged with respect to the track part about an axis being parallel to the rotation axes of the drive wheels so as to distribute the normal force exerted by the biasing means equally between the drive wheels engaged by the drive means.

6. The conveyor according to claim 1, wherein the friction coefficient ($\mu$) between the drive wheels and the drive means as well as the friction coefficient between the drive wheels and the support means are greater than tangents to the angle ($\phi$) between the tensioning path and the direction of movement of the chain.

7. The conveyor according to claim 6, wherein the friction coefficients ($\mu$) are up to 1.5 times the tangents to said angle ($\phi$), preferably in the range from 1.1 to 1.3 times the tangents to said angle ($\phi$).

8. The conveyor according to claim 1, wherein the surfaces of the drive means and the support means engaging the drive wheels are equipped with a friction enhancing material, so as to prevent slippage between the wheels and the drive means and between the wheels and the support means.

9. The conveyor according to claim 8, wherein the friction enhancing material is selected from the group consisting of: natural rubber and synthetic rubber.

10. A drive mechanism for driving a conveyor and comprising:
 a drive means for engaging and applying a driving force to a drive chain of the conveyor, whereby the drive chain, when supported by a stationary support means, exerts a reactive force on the drive means when the driving force is applied to the drive chain, and
 biasing means arranged for biasing the drive means towards the drive chain so as to exert a variable normal force on the drive chain, the biasing means being adapted to adjust the normal force in dependence of the driving force, so that the driving force has a magnitude sufficient to prevent slippage between the chain and the drive means, wherein the biasing means is constituted by a frame part on which the drive means are arranged, the frame part being displaceably arranged along a tensioning path defining an acute angle ($\phi$) with the direction of movement of the drive chain so that the reactive force biases the drive means towards the drive chain.

11. The drive mechanism according to claim 10, wherein the friction coefficient ($\mu$) between engaging parts of the drive chain and the drive means is greater than tangents to the angle ($\phi$) between the tensioning path and the direction of movement of the drive chain.

12. A conveyor according to claim 11, wherein the friction coefficients ($\mu$) is up to 1.5 times the tangents to said angle ($\phi$), preferably in the range from 1.1 to 1.3 times the tangents to said angle ($\phi$).

* * * * *